United States Patent [19]

Haruna

[11] Patent Number: 5,048,008
[45] Date of Patent: Sep. 10, 1991

[54] DISK CARTRIDGE

[75] Inventor: Shuji Haruna, Tokyo, Japan

[73] Assignee: Sony Corporation, Tokyo, Japan

[21] Appl. No.: 320,286

[22] Filed: Mar. 7, 1989

[30] Foreign Application Priority Data

Mar. 11, 1988 [JP] Japan .................................. 63-57970
Jun. 30, 1988 [JP] Japan ............................. 63-86810[U]

[51] Int. Cl.$^5$ .......................................... G11B 23/033
[52] U.S. Cl. .................................... 369/291; 360/132; 206/444
[58] Field of Search ................ 369/272, 291; 206/444; 220/200, 230, 324, 326; 360/131, 132, 133, 135

[56] References Cited

U.S. PATENT DOCUMENTS

| | | | |
|---|---|---|---|
| 3,951,264 | 4/1976 | Heidecker et al. .................. | 206/444 |
| 4,455,642 | 6/1984 | Inaba .................................... | 369/291 |
| 4,460,930 | 7/1984 | Takahashi ....................... | 360/132 X |
| 4,536,812 | 8/1985 | Oishi et al. ........................... | 360/133 |
| 4,549,240 | 10/1985 | Hodges ................................ | 360/133 |
| 4,618,060 | 10/1986 | Tarter ................................... | 206/444 |
| 4,618,061 | 10/1986 | Rubenfeld .......................... | 206/444 |
| 4,665,457 | 5/1987 | Odawara et al. .................... | 360/133 |
| 4,669,078 | 5/1987 | Ogusu ............................. | 360/133 X |
| 4,685,017 | 8/1987 | Swinburne et al. ................. | 360/133 |
| 4,746,013 | 5/1988 | Suzuki et al. ................... | 369/291 X |
| 4,805,061 | 2/1989 | Champagne et al. ............... | 360/133 |
| 4,816,954 | 3/1989 | Woods ................................ | 360/133 |
| 4,860,142 | 8/1989 | DiGiesi .............................. | 360/133 |

FOREIGN PATENT DOCUMENTS

| | | | |
|---|---|---|---|
| 0032771 | 7/1981 | European Pat. Off. ............ | 369/291 |
| 0159860 | 10/1985 | European Pat. Off. . | |
| 0206897 | 12/1986 | European Pat. Off. . | |
| 2756840 | 6/1978 | Fed. Rep. of Germany ...... | 369/291 |
| 2486497 | 1/1982 | France . | |
| 2584225 | 1/1987 | France ................................ | 369/291 |
| 2090226A | 7/1982 | United Kingdom . | |
| 2134306 | 8/1984 | United Kingdom . | |

OTHER PUBLICATIONS

Patent Abstract of Japan, vol. 7, No. 260 (P-239)(1411), Nov. 26, 1983, and JP-A-58 147868 (Dainippon Insatsu), Sep. 2, 1983.
Patent Abstract of Japan, vol. 7, No. 266 (P-237)(1405), Nov. 1983, and JP-A-58 141473 (Kiyanon Denshi), Aug. 22, 1983.

*Primary Examiner*—Bentsu Ro
*Attorney, Agent, or Firm*—Philip M. Shaw, Jr.

[57] ABSTRACT

A disk cartridge having a disk cartridge-body in which a disk-shaped record medium is rotatably accommodated and an information signal can be recorded on the disk-shaped record medium, the disk cartridge-body having an opening portion to exchange therethrough the disk-shaped record medium, an openable and closable member for opening and closing the opening portion through which the disk-shaped record medium is exchanged and a write-protecting mechanism formed on the openable and closable member to determine whether or not an information signal can be recorded in the disk-shaped record medium.

10 Claims, 8 Drawing Sheets

DISK CARTRIDGE

BACKGROUND OF THE INVENTION

1. Field of the Invention

The present invention relates generally to disk cartridges and more particularly to a disk cartridge which can prevent the disk surface from being damaged or the like when a disk is exchanged and which includes a write-protecting mechanism to determine whether or not an information signal is recorded on a disk.

2. Description of the Prior Art

There has conventionally been proposed a disk-shaped record medium, such as, a so-called write once optical disk in which an information signal can be recorded and a rewritable optical disk from which the recorded information signal can be erased. This disk-shaped record medium is generally accommodated in some suitable disk cartridge in order to prevent it from being smudged by dust or the like when it is not loaded onto a recording and/or reproducing apparatus, i.e., upon non-use. Also, the disk-shaped record medium is accommodated in the disk cartridge in order to protect it from being damaged when it is brought in contact with other discs. It should be noted that when the disk-shaped record medium is damaged as described above, an error occurs in the writing and/or reading operation of the information signal. For simplicity, the disk-shaped record medium will, hereinafter, be referred to as a disk.

For example, U.S. Pat. Nos. 4,669,078 and 4,460,930 disclose this kind of disk cartridge. This disk cartridge is provided with an opening portion through which a part of the disk is exposed in a range of its outer periphery to its central portion along the diametrical direction thereof by a predetermined width. When the disk cartridge is loaded on the recording and/or reproducing apparatus while accommodating the disk therein, the disk can be recorded on and/or reproduced from by the pickup device of the recording and/or reproducing apparatus through the opening portion. This opening portion is formed such that when the disk cartridge is loaded on the recording and/or reproducing apparatus, a disk turn table is provided within the recording and/or reproducing apparatus-body to rotate the disk. A chucking member which rotates the disk in cooperation with the disk turn table, is opposed to the central portion of the disk through this opening portion. The pickup device of the recording and/or reproducing apparatus is opposed to the signal recorded portion of the disk. Further, the disk cartridge is provided with a sliding shutter which is slidably fitted to one side wall of the disk cartridge, for example, to the front surface thereof in the direction in which the disk cartridge is inserted in to the recording and/or reproducing apparatus. This sliding shutter is adapted to open and close the opening portion of the disk cartridge. The sliding shutter is restricted in its slidable movement when it is located at a position in which the opening portion of the disk cartridge is closed thereby, namely, the closing position. The thus arranged sliding shutter can be prevented from being opened inadvertently so that the disk is protected from dust and so on entering therein via the above opening portion.

Furthermore, U.S. Pat. No. 4,460,930 discloses the disk cartridge that is provided with a write-protecting mechanism. According to this write-protecting mechanism, it is possible to prevent the previously-recorded information on the disk from being damaged when a different information signal is recorded or erased by a head assembly of the recording and/or reoproducing apparatus from the portion in which the information signal is already recorded. The above U.S. Pat. No. 4,460,930 discloses the write-protecting mechanism fitted to the disk cartridge at its corner portion of the rear wall side, or at its end edge opposing to the side in which the sliding shutter is provided. The write-protecting mechanism disclosed in U.S. Pat. No. 4,460,930 is adapted to determine by the position of the detecting element, slidable within the detecting opening portion formed through the disk cartridge-body, whether or not the recording of the information signal on the disk is permitted. When the thus arranged disk cartridge is loaded in the recording and/or reproducing apparatus, the detecting element can be detected by detecting means such as a switch or the like provided in the recording and/or reproducing apparatus-body. Simultaneously, the detecting element of the disk cartridge can be visually confirmed by the user.

When the disk cannot be recorded and/or reproduced due to some factors or the disk cartridge is broken while the disk is normal, either the disk cartridge or the disk becomes useless. To remove the above defects, there is proposed such a disk cartridge as disclosed in U.S. Pat. No. 4,669,078. According to the disk cartridge disclosed in U.S. Pat. No. 4,669,078, the disk accommodated therein can be exchanged. That is, this disk cartridge is formed of a pair of upper and lower cartridge halves. According to this disk cartridge, the upper cartridge half is fitted to the lower cartridge half provided with a disk accommodating portion so as to become openable and closable, thus permitting the exchange of the disk.

The disk cartridge disclosed in U.S. Pat. No. 4,460,930 may be modified into the disk cartridge disclosed in U.S. Pat. No. 4,669,078 in which the disk accommodated therein can be exchanged. In that case, an opening portion that allows the disk to be exchanged has to be formed on the rear wall side of the disk cartridge and an openable and closable member to open and close the above-mentioned opening portion has to be formed. The reason therefor is as follows. If the opening portion and the openable and closable member are provided on the disk cartridge-body at its one side wall of both side walls in parallel to the direction in which the disk cartridge is loaded on the recording and/or reproducing apparatus, when the disk cartridge is loaded on or ejected from the recording and/or reproducing apparatus, the openable and closable member is raised up from the disk cartridge-body to be caught by a loading mechanism of the recording and/or reproducing apparatus. There is then a risk that the disk cartridge will not be loaded on or ejected from the recording and/or reproducing apparatus. Eventually, the disk cartridge cannot be stably loaded on or ejected from the recording and/or reproducing apparatus. This leads to trouble in the recording and/or reproducing apparatus.

If the opening portion and the openable and closable member are provided at the rear wall side of the disk cartridge-body, the following problems arise.

Specifically, the write-protecting mechanism is provided at the rear wall side of the disk cartridge-body so that when the opening portion is formed on the same rear wall side, the write-protecting mechanism hinders the exchange of the disk. Further, the write-protecting mechanism protrudes from the inner surfaces of the pair of upper and lower cartridge halves forming the disk cartridge-body of the disk cartridge so that when the disk is exchanged, the disk surface comes in contact with the write-protecting mechanism, whereby the disk surface is scratched or damaged. If the thus damaged disk is recorded on and/or reproduced from by the recording and/or reproducing apparatus, an error occurs in the writing and/or reading operation of the information signal. The result is that the normal recording and/or reproduction is impossible.

OBJECTS AND SUMMARY OF THE INVENTION

Accordingly, it is an object of the present invention to provide an improved disk cartridge which does not have the defects inherent in the prior art.

It is another object of the present invention to provide a disk cartridge which can prevent a disk surface from being damaged when the disk is exchanged.

It is a further object of the present invention to provide a disk cartridge which includes a write-protecting mechanism for positively determining whether or not an information signal can be recorded on a disk.

It is a yet further object of the present invention to provide a disk cartridge in which an openable and closable member for opening and closing an opening portion of the disk cartridge to exchange a disk can be positively locked.

It is yet a further object of the present invention to provide a disk cartridge in which a locking force for locking an openable and closable member can be freely determined.

It is still a further object of the present invention to provide a disk cartridge which prevent dust or the like from entering a disk cartridge-body through a slit on a flexibly deformed lid.

In accordance with an aspect of the present invention, there is provided a disk cartridge which comprises a disk cartridge-body having an opening portion through which a signal-recorded-portion of a disk-shaped record medium accommodated therein is exposed, a sliding shutter slidably fitted to the disk cartridge-body to open and close the opening portion, and a write-protecting mechanism provided on an openable and closable member that is fitted to the disk cartridge-body to become freely openable and closable, thereby allowing the disk to be exchanged. According to the thus constructed disk cartridge of the present invention, the write-protecting mechanism is provided on the openable and closable member which opens and closes the opening portion through which the disk is exchanged so that one inner surface of the disk cartridge-body becomes flat to be free from trouble in exchanging the disk. Thus, the disk surface, particularly, the signal-recorded-surface of the disk can be protected from being damaged.

The above, and other objects, features and advantages of the present invention will become apparent from the following detailed description of the preferred embodiments which are to be read in conjunction with the accompanying drawings, throughout which like reference numerals identify the same or similar elements.

DETAILED DESCRIPTION OF THE PREFERRED EMBODIMENTS

The first embodiment of a disk cartridge according to the present invention will hereinafter be described in detail with reference to FIGS. 1 to 5.

Figure 2:
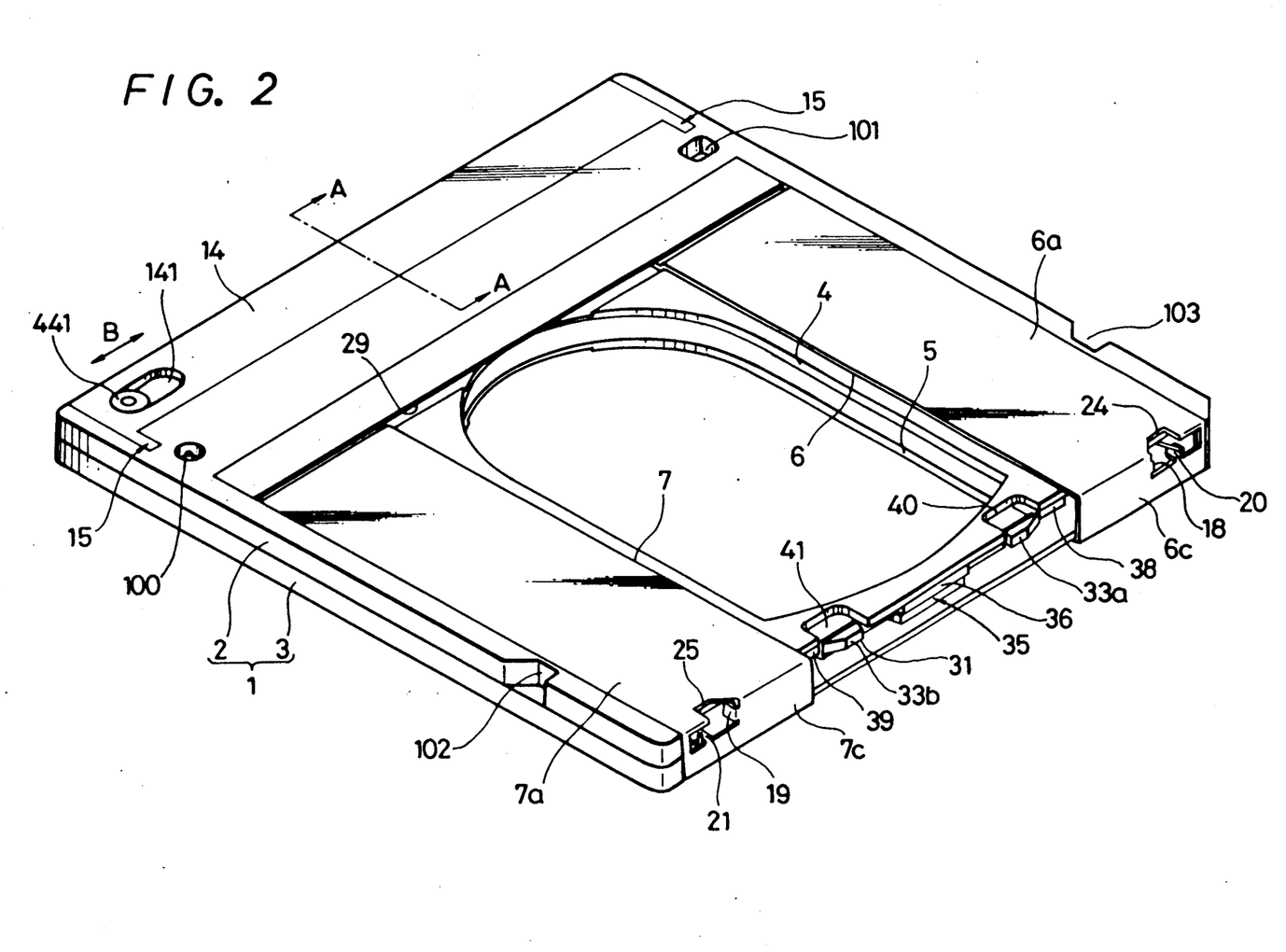
FIG. 2 is a perspective view illustrating the disk cartridge of FIG. 1 in which its sliding shutter is opened as viewed from the upper surface side thereof.
Figure 3:
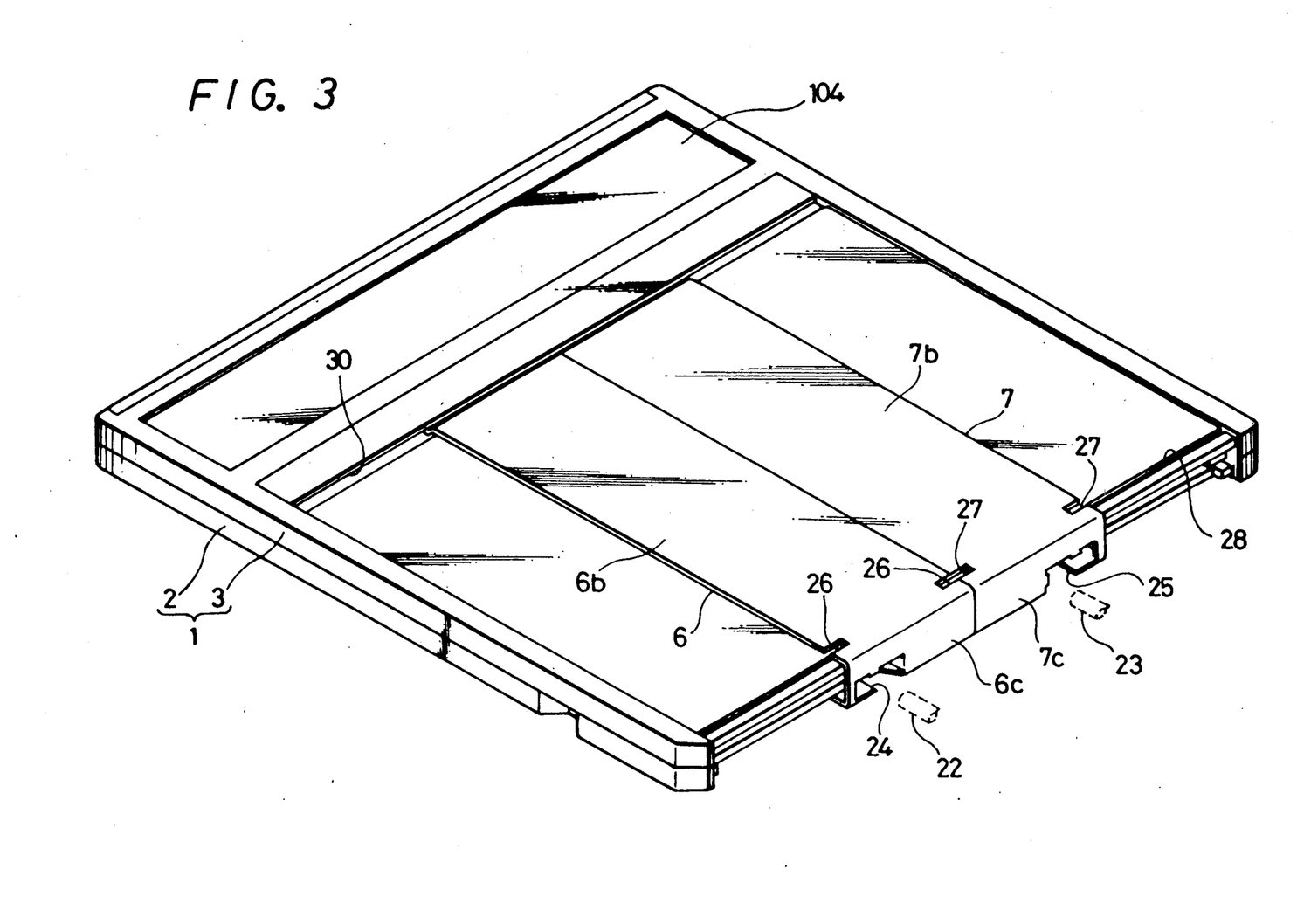
FIG. 3 is a perspective view illustrating the disk cartridge of FIG. 1 in which its sliding shutter is closed as viewed from the lower surface side thereof.
Figure 4:
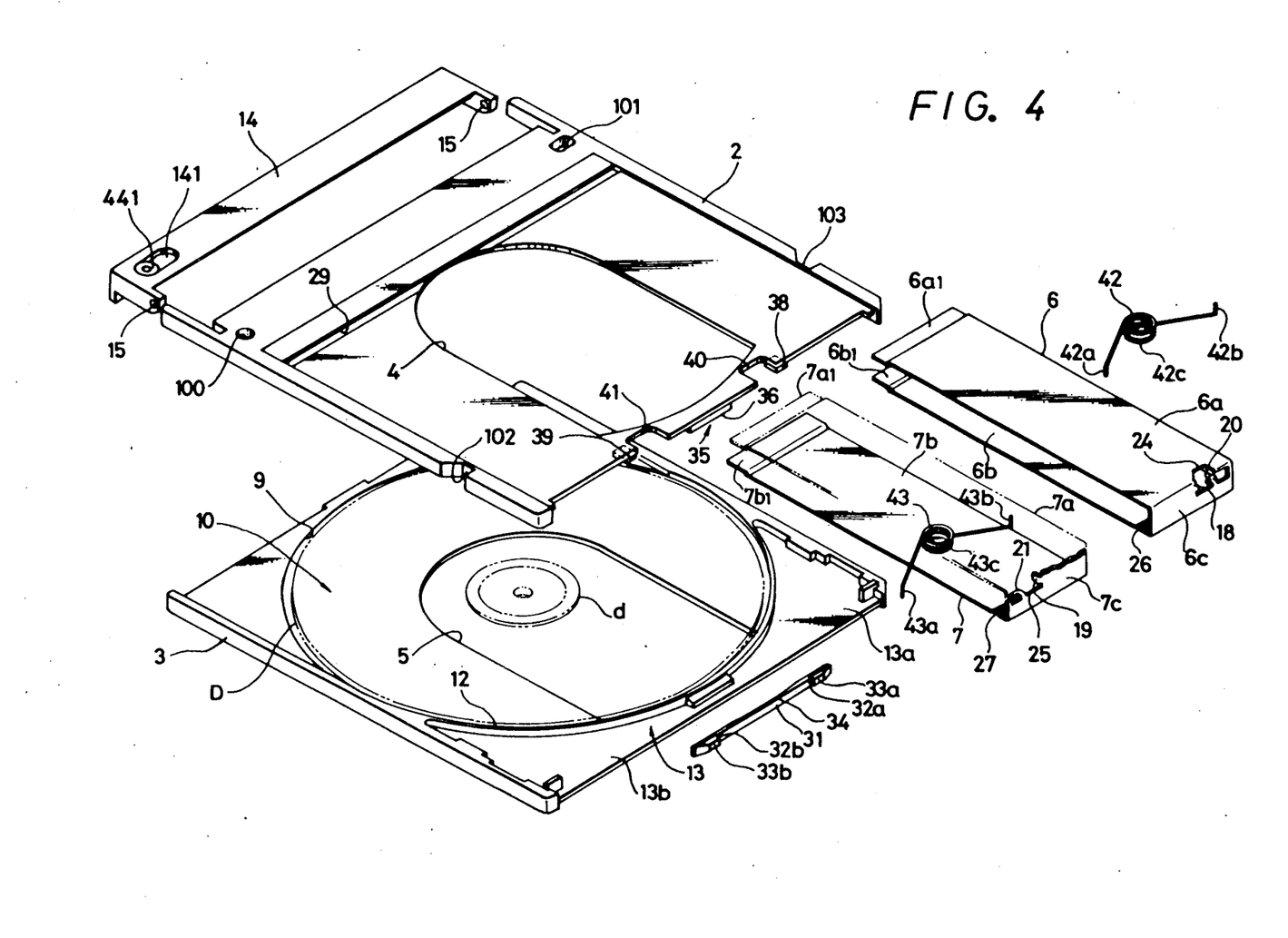
FIG. 4 is an exploded, perspective view of the embodiment of a disk cartridge shown in FIGS. 2 and 3.

According to the first embodiment of the present invention, as shown in FIGS. 2 to 4, a disk cartridge-body 1 is comprised of an upper cartridge half 2 and a lower cartridge half 3. The upper and lower cartridge halves 2 and 3 are secured together by some suitable connecting means such as screws or the like, though not shown. The upper and lower cartridge halves 2 and 3 are substantially flat, rectangular and are made by the injection molding-process of a synthetic resin. Within the disk cartridge-body 1, there is rotatably provided a disk-shaped record medium D such as an optical disk or the like on which an information signal can be at least recorded. For simplicity, this disk-shaped record medium D will hereinafter be referred to as the disk D. Opening portions 4 and 5 which are substantially rectangular are formed through the upper and lower cartridge halves 2 and 3 in a size ranging from their central portions to their front edge portions. Through the opening portions 4 and 5, a chucking portion d' provided at the central portion of the disk D' accommodated in the disk cartridge-body 1, is 25 exposed (see FIG. 4) outside. An information signal writing and/or reading means also faces the disk D, though not shown. The information signal writing and/or reading means is an optical pickup device or the like. By the optical pickup device, an information signal is written on the disk D and the thus written information signal is read out therefrom.

. The opening portions 4 and 5 are opened and closed by a so-called sliding shutter. In the first embodiment, the disk D has a diameter as small as 8 cm. The opening portions 4 and 5, to which the information signal writing and/or reading means is faced, are wide enough as compared with the size of the disk cartridge-body 1 so that the sliding shutter is divided to provide a pair of sliding shutters 6 and 7 that are slidably moved in exactly the opposite directions (or left and right or vice versa) as shown in, for example, FIGS. 2 and 3. Each of the sliding shutters 6 and 7 is made of a metal plate such as a stainless steel plate or the like and is formed to have a U-letter configuration. The sliding shutters 6 and 7 are slidably engaged with the outer wall of the disk cartridge-body 1 and are moved from the left and right halves of the opening portions 4 and 5 to the flat portions of the upper and lower cartridge halves 2 and 3.

Figure 1:
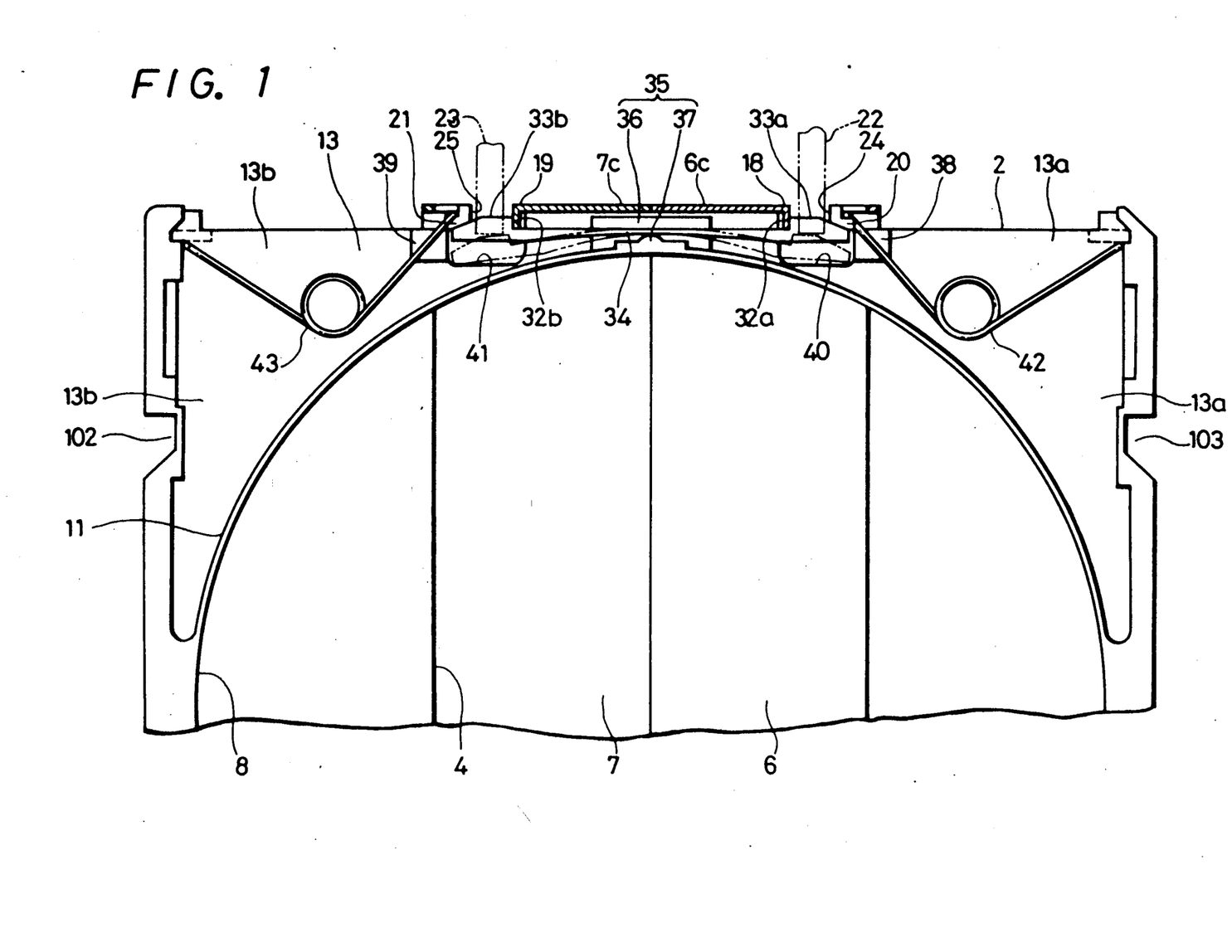
FIG. 1 is a plan view of a main portion of an embodiment of a disk cartridge according to the present invention, illustrating the inside of the disk cartridge.

Circular concave portions 8 and 9 are formed on the inner surfaces of the upper and lower cartridge halves 2 and 3 as shown in FIGS. 1 and 4. Each of the circular concave portions 8 and 9 is circumferential in configuration and is slightly larger than the outer diameter of the disk D. These circular concave portions 8 and 9 are opposed to each other to construct a disk-accommodating-portion 10 (see FIG. 4). Ribs 11 and 12 of arc configurations are respectively protrude from the inner surface of cartridge halves 2 and 3 along the front half peripheral portions of the circular concave portions 8 and 9, thereby constructing the front wall of the disk cartridge-body 1 as shown in FIGS. 1 and 4. The heights of the arc-shaped ribs 11 and 12 are substantially equal to each other and abut to each other when assembled. The front portion of the front wall of the disk cartridge-body 1 forms a space portion 13 which is exposed forward.

To the rear portion of the upper cartridge half 2, a lid 14 is rotatably fitted as an openable and closable member that constructs the rear upper surface and the rear wall of the disk cartridge-body 1. When the lid 14 is opened, the disk-accommodating-portion 10 is opened backward.

In this embodiment, the lid 14 is coupled to the upper cartridge half 2 at both rear wall portions of the upper cartridge half 2 by means of hinge portions 15 as shown in FIG. 4. Each of the hinge portions 15 is formed by a combination of a protrusion and a concave portion, though not shown.

Figure 5:
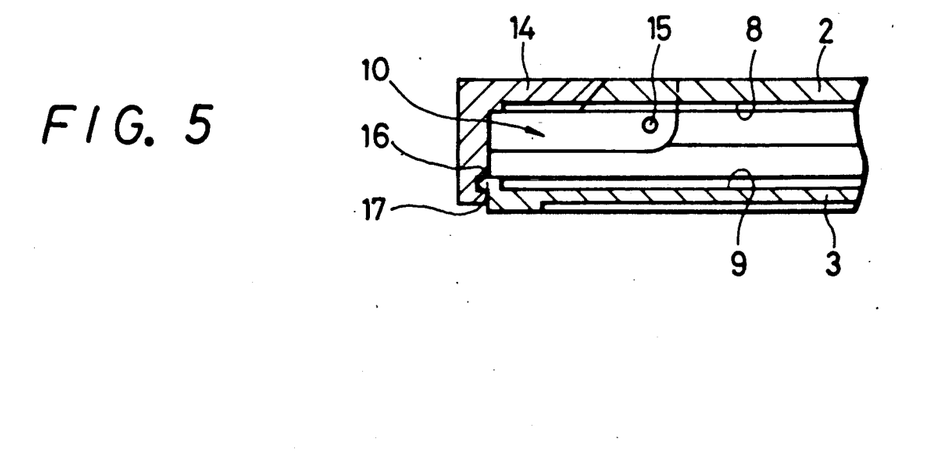
FIG. 5 is a fragmentary, enlarged cross-sectional view taken through the line A—A in FIG. 2.

As seen in FIG. 5 forming a fragmentary, enlarged cross-sectional view taken through the line A—A in FIG. 2, an engaging concave portion 16 is formed on the lower inner surface of the rear wall of the lid 14 as a locked portion. Simultaneously, an engaging protrusion 17 is formed on the rear end edge of the flat portion of the lower cartridge half 3 as a locking portion. The engaging concave portion 16 and the engaging protrusion 17 constitute locking means. Thus, when the engaging concave portion 16 and the engaging protrusion 17 are engaged with each other, the lid 14 is locked at its closed position.

Figure 6A:
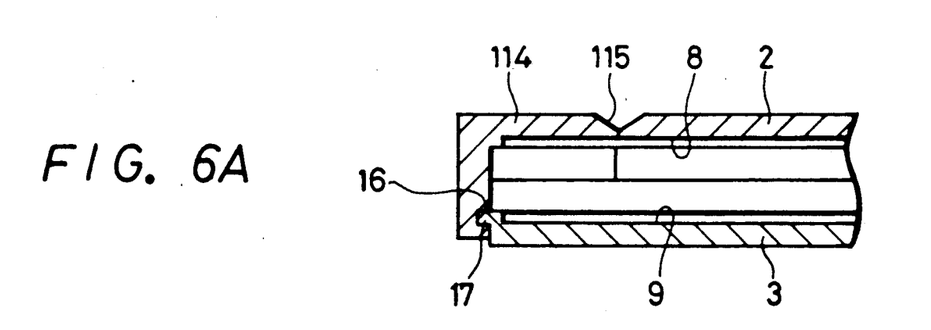
FIGS. 6A and 6B are respectively cross-sectional views illustrating other examples corresponding to the example shown in FIG. 5.
Figure 6B:
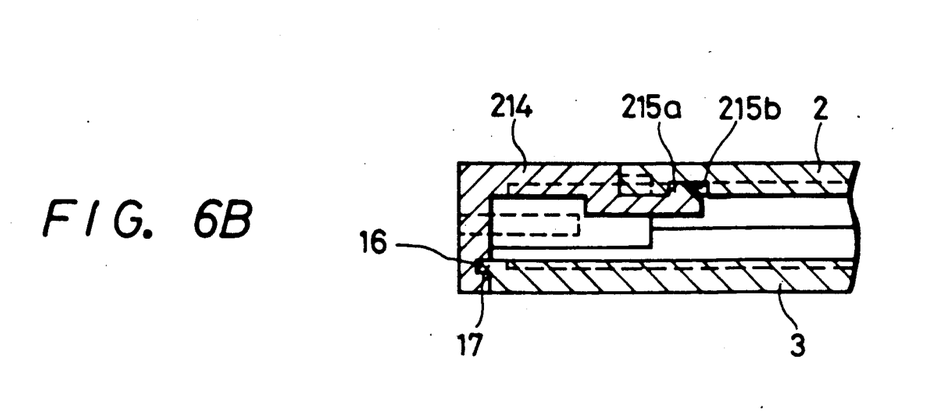

Alternatively, the above-mentioned lid 14 provided at the rear portion of the disk cartridge-body 1 may be modified into a wide variety of lids. FIGS. 6A and 6B correspond to FIG. 5 and illustrate examples of such variations of lids, respectively.

Referring initially to FIG. 6A, a lid 114, serving as the openable and closable member, is formed as one body with the upper cartridge half 2 so that the lid 114 can be opened and closed about a thin curved hinge portion 115 formed on the portion between the lid 114 and the upper cartridge half 2. In this case, the lid 114 is locked to the lower cartridge half 3 by the engagement between the engaging concave portion 16 and the engaging protrusion 17 similar to that of the embodiment shown in FIG. 5.

Further, as FIG. 6B shows, a lid 214 is provided as the openable and closable member. The lid 214 is formed independently of the upper cartridge half 2 and is inserted to be hinged to the upper cartridge half 2 by the engagement between an engaging protrusion 215a formed on the lid 214 and an engaging recess 215b formed on the upper cartridge half 2. Also, the lid 214 is locked to the lower cartridge half 3 by the engagement between the engaging concave portion 16 and the engaging protrusion 17 similarly as described above.

Of course, the lid of the disk cartridge-body 1 of the present invention is not limited to the above two variations but may take various modifications and variations thereof.

As shown in FIGS. 2 and 4, through the upper cartridge half 2, there are formed engaging apertures 100 and 101 are formed and cut-away portions 102 and 103 are formed on the both side walls of the upper cartridge half 2, respectively. The engaging apertures 100 and 101 are engaged with positioning pins (not shown) provided within a recording and/or reproducing apparatus-body when the disk cartridge is loaded in the recording and-/or reproducing apparatus. The cut-away portions 102 and 103 are engaged with a cartridge conveying mechanism (not shown) of a recording and/or reproducing apparatus that is given a so-called automatic-changing function to change the disk cartridge when the disk cartridge is loaded on the recording and/or reproducing apparatus.

As shown in FIG. 3, a concave portion 104 is formed on the lower cartridge half 3 to hold thereon a label or the like on which the contents recorded on the disk D are written.

Referring to FIGS. 2 and 4, on the front walls of the sliding shutters 6 and 7, i.e., joint walls 6c and 7c which connect walls 6a, 6b and 7a, 7b which close the opening portions 4 and 5, there are formed engaged piece members 18 and 19 which are respectively inwardly erected from the joint walls 6c and 7c at their substantially central positions in the width direction. Also, on the joint walls 6c and 7c engaged members 20 and 21 extend inwardly at the positions near the outside and at substantially the centers in the height direction of the joint walls 6c and 7c. The engaged piece members 18, 19 and the engaged members 20, 21 are inserted into the front space portion 13 of the disk cartridge-body 1, respectively. Cut-away operation pin insertion apertures 24 and 25 are formed from upper closing walls 6a and 7a of the shutters 6 and 7 at the side of the upper cartridge half 2 to the joint walls 6c and 7c. To the apertures 24 and 25, there are engaged lock releasing and opening operation pins 22 and 23 (see FIG. 3) which are provided within the recording and/or reproducing apparatus-body. The lock releasing and opening operation pins 22 and 23 will hereinafter be referred to as operation pins for simplicity. Guided members 26 and 27 are inwardly erected from both outer edge portions at front sides of lower closing walls 6b and 7b at the side of the lower cartridge half 3. As shown in FIG. 3, the guided members 26 and 27 are guided along a guide groove 28 that is formed straight on the front end portion of the lower cartridge half 3 in the lateral direction.

As shown in FIGS. 3 and 4, at the rear end portions of the closing walls 6a, 6b and 7a, 7b of the sliding shutters 6 and 7 guided portions $6_{a1}$, $6_{b1}$ and $7_{a1}$, $7_{b1}$ are formed in inwardly-curved step configurations which are respectively inserted into guide slits 29 and 30 formed on the flat surface portions of the upper and lower cartridge halves 2 and 3 at the position near the rear ends of the opening portions 4 and 5 in the lateral direction.

On the central portion of the front space portion 13 of the disk cartridge-body 1, there is provided a locking member 31 that engages with the engaged members 18 and 19 of the sliding shutters 6 and 7 to lock the sliding shutters 6 and 7 when the sliding shutters 6 and 7 are located so as to close the opening portions 4 and 5.

As shown in FIG. 4, the locking member 31 is made by the molding-process of the synthetic resin and has a lever-like configuration. This locking member 31 comprises engaging portions 32a, 32b formed at both of its front end portions to be outwardly engaged with the engaged members 18, 19 of the sliding shutters 6 and 7 and pushed portions 33a, 33b, of which the outer half portions are inclined toward the ends of the locking member 31, outside both of the engaging portions 32a and 32b. The intermediate portion of the locking member 31 is formed thin to provide a flexible displacing portion 34.

As shown in FIG. 1, the locking member 31 is mounted on a supporting portion 35 provided at the central portion of the front space portion 13 of the disk cartridge-body 1 at its intermediate flexible displacing portion 34 so as to become movable in the lateral direction. The supporting portion 35 is comprised of a pushing member 36 protruding from the inner surface of the front central portion of the upper cartridge half 2 and a projection 37 projecting from the center of the outer surface of the arc-shaped rib 11. Thus, the locking member 31 is fitted to the supporting portion 35 by inserting the flexible displacing portion 34 between the pushing member 36 and the projection 37, whereby both end portions, i.e., both engaging portions 32a and 32b of the locking member 31, are displaced around the projection 37 with flexibility.

Stopper plates 38 and 39 project from the inner surface of the upper cartridge half 2 at both sides of the supporting portion 35 so as to oppose the both ends of the locking member 31, i.e., the tip ends of the pushed portions 33a, 33b with a predetermined spacing therebetween, thus restricting the locking member 31 from being moved too much. Cut-away portions 40 and 41 are formed through the front portion of the upper cartridge half 2 at its position inside the stopper portions 38 and 39, respectively.

A pair of torsion springs 42 and 43 wound in the same direction are located in right and left space portions 13a and 13b of the front space portion 13 in the disk cartridge-body 1 and are thereby interposed in the spaces defined by the disk cartridge-body 1, i.e., both side wall portions of the upper and lower cartridge halves 2, 3 and the engaged members 20, 21 of the sliding shutters 6 and 7, thus the sliding shutters 6 and 7 are always spring-biased in the directions to close the opening portions 4 and 5. As shown in FIG. 4, both end portions 42a, 42b and 43a, 43b of the torsion springs 42 and 43, are respectively curved in parallel to their coiled portions 42c and 43c to form engaging portions. On the other hand, the engaged members 20 and 21 of the sliding shutters 6 and 7 are formed on the joint walls 6c and 7c of the sliding shutters 6 and 7 at their positions of substantially the centers in the height direction so that the torsion springs 42 and 43 of the same type and wound in the same direction can, be utilized without trouble. Thus, the assembly-process of the torsion springs 42 and 43 in the manufacturing-process of the disk cartridge can be simplified. Also, it is not necessary to choose the torsion springs 42 and 43, and hence, the torsion springs 42 and 43 can be kept conveniently.

In the thus made disk cartridge, the lid 14 is provided with a write-protecting mechanism whereby whether or not the information signal is written in the disk D can be determined when the disk cartridge is loaded in the recording and/or reproducing apparatus or visually confirmed by the user. The write-protecting mechanism of the invention will be described next with reference to FIGS. 7 and 8.

Figure 7:
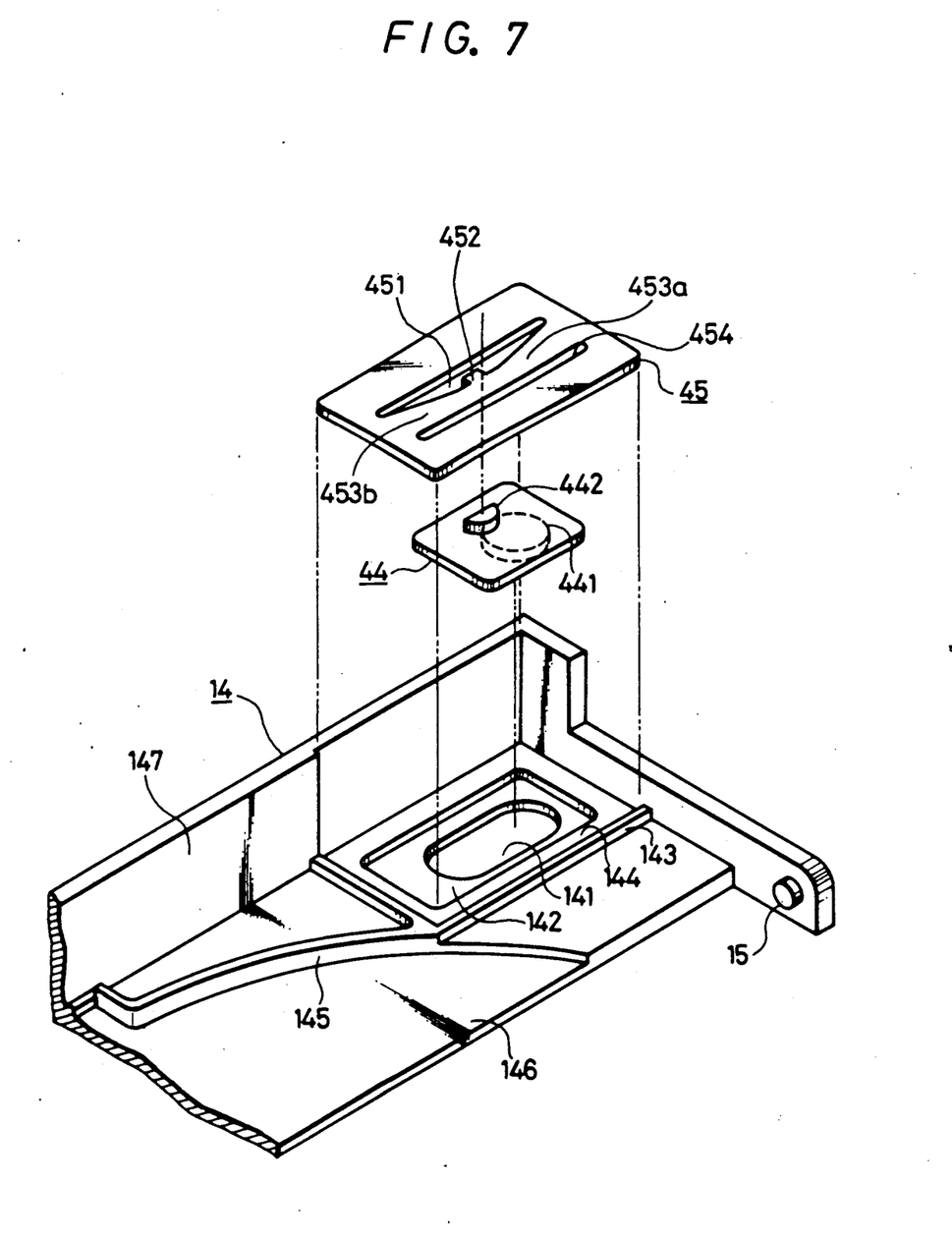
FIG. 7 is an exploded, perspective view and illustrates a main portion of the embodiment of the disk cartridge shown in FIG. 2.
Figure 8:
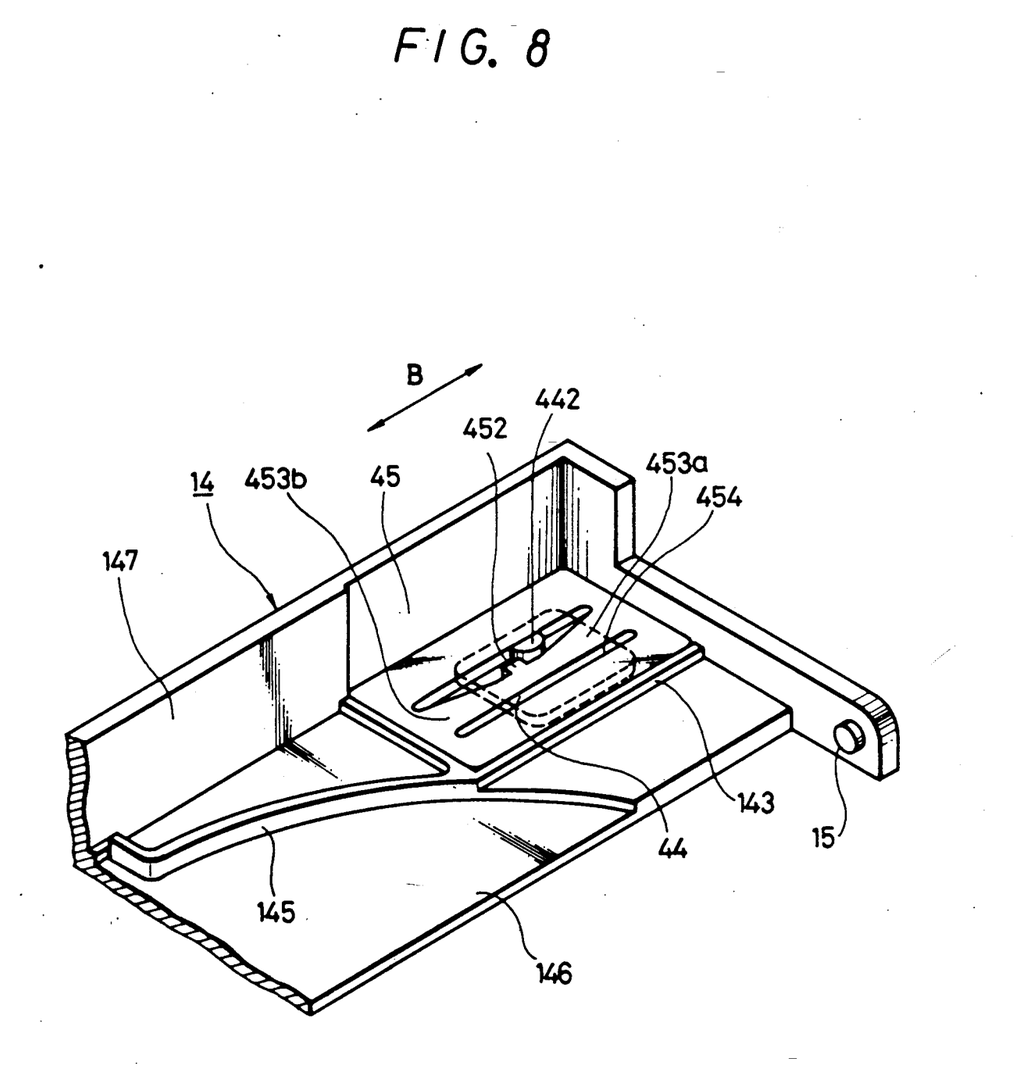
FIG. 8 is a perspective view illustrating an assembled state of the main portion of the embodiment shown in FIG. 7.

Referring to FIGS. 7 and 8, the write-protecting mechanism of the invention comprises an over-write-preventing member 44 made of a synthetic resin and a position restricting member 45 of a plate configuration made of a synthetic resin. The over-write-preventing member 44 is provided with a switching operation portion 441 formed on one surface of the over-write-preventing member 44 at the position displaced from its central portion and an engaging projection 442 formed on the other surface of the over-write preventing member 44 at its substantially central position. The switching operation member 441 is exposed outside through a detecting opening 141 of the lid 14 so that it can be operated from the outside of the lid 14. The over-write-preventing member 44 is freely movable in the direction shown by an arrow B in FIG. 8 within a first concave portion 142 formed on the inner surface of the lid 14. Under the condition that the over-write-preventing member 44 is placed within the first concave portion 142 of the lid 14, the engaging projection 442 of the over-write-preventing member 44 is engaged with an opening portion 451 of the position restricting member 45, thus the over-write-preventing member 44 and the position restricting member 45 are engaged with each other so as to form a laminated layer.

The position restricting member 45 is secured at its peripheral portion to a second concave portion 144 defined by a rib 143 formed on the inner surface of the lid 14 by means of some suitable method such as a bonding-process or the like. Since the position restricting member 45 is secured, the over-write-preventing member 44 can be protected from being disengaged from the lid 14. Alternatively, a disengage-protecting portion may be provided in either the over-write-preventing member 44 or the first concave portion 142 of the lid 14. It is preferable that the afore-mentioned respective members and the first concave portions of the lid 14 are formed so as to prevent the engaging projection 442 from being projected to the upper surface of the position restricting member 45 under the condition that the position restricting member 45 is mounted on the second concave portion 144 formed on the inner surface of the lid 14.

Under the condition that the respective members are assembled as shown in FIG. 8, the over-write-preventing member 44 is selectively moved between the first and second positions by moving the switching operation member 441 in the predetermined direction B by suitable means such as a point of a pen or the like. The first position means that the information signal now can be written in the disk D or that the switching operation member 441 is placed at the side of one arm portion 453a of the position restricting member 45 within the first concave portion 142. The second position, on the other hand, means that the information signal is inhibited from being written on the disk D or that the switching operation member 441 is placed at the side of the other arm portion 453b of the position restricting member 45 within the first concave portion 142. The movement of the over-write-preventing member 44 is restricted by the engagement between the engaging projection 442 of the over-write-preventing member 44 and an elongated member 452 elongated inwardly to the opening portion 451 of the position restricting member 45. The over-write-preventing member 44 is moved from the first position to the second position or vice versa in a so-called click fashion by operating the switching operation member 441 from the outside of the lid 14 to allow the engaging projection 442 to push the elongated member 452 toward the outside of the opening portion 451, thus deforming the arm portions 453a and 453b with flexibility. With the thus made arrangement, the over-write-preventing member 44 can be prevented from being moved inadvertently.

Further, as shown in FIGS. 7 and 8, on the inner surface of the lid 14, a rib 145 is formed having an arc-configuration and an arc-shaped thin portion 146 which forms a part of the circular concave portion 8 on the upper cartridge half 2 when the lid 14 is in its closed state. Since the rib 145 is formed on the inner surface of the lid 14 as described above, the outer peripheral end face of the disk D is prevented from being brought in direct contact with a wall portion 147 of the lid 14 which forms the rear wall surface of the disk cartridge-body 1. Thus, the wall portion 147 is protected from being damaged. In addition, the over-write-preventing member 44 serves, when the disk cartridge is loaded onto the recording and/or reproducing apparatus, as an element to be detected by detecting means that is provided within the recording and/or reproducing apparatus-body for detecting whether or not the information signal can be recorded on the disk. While, the position restricting member 45 serves as means for preventing the over-write-preventing member 44 from being disengaged from the lid 14 as described hereinbefore.

The operation of the thus made disk cartridge upon use will be described hereinafter.

First, the lid 14 at the rear portion of the disk cartridge-body 1 is rotated around the hinge portions 15 to expose the disk D which is accommodated within the disk-accommodating-portion 10 which is formed of the circular concave portions 8 and 9 of the upper and lower cartridge halves 2 and 3. Thereafter, the lid 14 is closed and its engaging concave portion 16 is engaged with the engaging projection 17 of the lower cartridge half 3 for locking. The sliding shutters 6 and 7 are spring-biased toward the opening portions 4 and 5 by the spring-biasing forces of the torsion springs 42 and 43 to allow their closing surfaces 6a, 7a and 6b, 7b to close the halves of the opening portions 4 and 5. In this state, the sliding shutters 6 and 7 are in their locked states due to the engagement between the engaging portions 32a, 32b of the locking member 31 and the engaged members 18, 19, thus the disk D being enclosed within the disk cartridge-body 1.

When the disk cartridge with the disk D accommodated therein is loaded into the recording and/or reproducing apparatus, the operation pins 22 and 23 of the apparatus shown by phantom lines in FIGS. 1 and 3 are inserted into the front space portion 13 of the disk cartridge-body 1 from the engaging openings 24, 25 through the cut-away concave portions 40, 41 of the upper cartridge half 2, whereby the pushed portions 33a and 33b of the locking member 31 are inwardly pushed as shown in FIG. 1 by two-dot chain lines.

When the portions 33a and 33b are pushed as described above, the locking member 31 is displaced with flexibility at its flexible displacing portion 34. Thus the engaging members 32a and 32b are disengaged from the engaged 5 members 18 and 19 of the sliding shutters 6 and 7, and the sliding shutters 6 and 7 are released from their locked states.

Under this condition, while engaged with the engaging openings 24 and 25 of the sliding shutters 6 and 7, the operation pins 22 and 23 are moved in the directions opposite to each other to permit the sliding shutters 6 and 7 to be slidably moved in the opening direction against the biasing forces of the torsion springs 42 and 43. When the operation pins 22 and 23 slidably move on the pushed portions 33a and 33b of the locking member 31 and come apart from the ends thereof, the flexible displacing portion 34 of the locking member 31 resiliently returns to the original condition, whereby the pushed portions 33a and 33b are brought in contact with the end edges of the sliding shutters 6 and 7. Consequently, under the condition that the opening portions 4 and 5 of the disk cartridge-body 1 are fully opened by the sliding shutters 6 and 7, the engaged members 18 and 19 are disengaged from the pushed portions 33a and 33b, thus the locking member 31 is returned to the original condition.

As described above, under the condition that the disk cartridge is loaded into the recording and/or reproducing apparatus, the detecting means formed of a switch or the like and provided within the apparatus-body detects the position of the over-write-preventing member 44 of the write-protecting mechanism. If the over-write-preventing member 44 is located at the first position, which position means that the information signal can be recorded in the disk D, the information signal writing and reading means is operative to record the information signal on the disk D. If on the other hand the over-write-preventing member 44 is placed at the second position, which position means that the recording of the information signal on the disk D is inhibited, the information signal writing and/or reading means is inhibited from writing the information signal on the disk D.

The closing operation of the sliding shutters 6 and 7 by which the opening portions 4 and 5 of the disk cartridge-body 1 are opened is just opposite to the opening operation of the sliding shutters 6 and 7.

Specifically, the operation pins 22 and 23 are returned by the ejecting operation of the recording and/or reproducing apparatus, whereby the sliding shutters 6 and 7 are slidably moved in the closing direction with the aid of the spring-biasing forces of the torsion springs 42 and 43. When the shutters 6 and 7 are slid in this way, the engaged members 18, 19 ride on the pushed portions 33a, 33b of the locking member 31 thereby gradually flexing the flexible displacing portion 34. When the operation pins 22 and 23 ride or push the thick portions of the pushed portions 33a and 33b, the locking member 31 is further flexed and the sliding shutters 6 and 7 are slidably moved in the closing directions. Then, the sliding shutters 6 and 7 are stopped in a face-to-face relationship and they close the opening portions 4 and 5 by their closing surfaces 6a, 7a and 6b, 7b, respectively.

Under this condition, the engaged members 18 and 19 of the sliding shutters 6 and 7 oppose the engaging members 32a and 32b of the locking member 31, respectively. Thus, when the disk cartridge is ejected from the recording and/or reproducing apparatus, the operation pins 22 and 23 are disengaged from the front side of the space portion 13 in the disk cartridge-body 1 and from the engaging openings 24 and 25 of the sliding shutters 6 and 7, releasing the pushed portions 33a and 33b of the locking member 31 from their pushed state. Consequently, the flexible displacing portion 34 is returned with flexibility to permit the engaging members 32a and 32b to be engaged with the engaged members 18 and 19 of the sliding shutters 6 and 7, locking the sliding shutters 6 and 7 in their locked states.

If the sliding shutter 6 or 7, which is in its locked state, is unintentionally slid in the opening direction against the spring-biasing force of the torsion spring 42 or 43, the locking member 31 is moved in the sliding direction of the sliding shutter 6 or 7 because the engaged member 18 or 19 thereof is engaged with the engaging member 32a or 32b of the locking member 31. In this case, however, the engaging surface portions 38 and 39 project from on the upper cartridge half 2 of the disk cartridge-body 1 with a predetermined spacing relative to both ends of the locking member 31 so that the locking member 31, which is moved with the slidable movement of the sliding shutter 6 or 7, abuts against the engaging surface portion 38 or 39 at its corresponding end portion and the locking member 31 is inhibited from being moved, thus the sliding shutter 6 or 7 is kept in its locked condition.

In the thus constructed disk catridge of this embodiment, since the locking mechanism for the sliding shutters 6 and 7 which close the opening portions 4 and 5 of the disk cartridge-body 1 is formed of the single locking member 31 of a lever-like configuration, the arrangement of the locking member 31 can be considerably simplified. Also, this locking member 31 is made movable relative to the disk cartridge-body 1 so that no tension is applied to the locking member 31. Thus, if its flexible displacing portion 34 is formed thin, then there is no risk that the flexible displacing portion 34 will be broken. Also, the force neccesary for returning the sliding shutters 6 and 7 to their original conditions can be reduced. Further, a space in which the locking member 31 is mounted on the disk cartridge-body 1 can be reduced considerably and hence, the locking member 31 of the present invention is particularly effective when applied to a locking mechanism of a compact-sized disk cartridge.

The thus constructed disk cartridge, in which the opening portion is formed on a part of the cartridge-housing to change the disk and also this opening is provided with the lid, cannot avoid the following defects.

That is, when the lid is locked or unlocked, the whole of the lid is deformed with the result that the flexed amount of the lid and the locking force are determined by the whole size of the lid to some extent. When the lid is deformed on the whole, this deformation hinders the smooth opening and/or closing operation of the lid. When a part of the lid is deformed so as to lock the lid, if the locking force is small, it is impossible to generate flexing force necessary for locking operation. Also, since the flexing amount is small, the locking portions are formed small due to the accuracy of the dimension of the respective parts or the like, thus the lid being easily released from its locked state. Also, the lid is repeatedly opened and closed, resulting in a possibility that the locking portion will be worn thin. Thus, the locking tends to be easily released.

Figure 9:
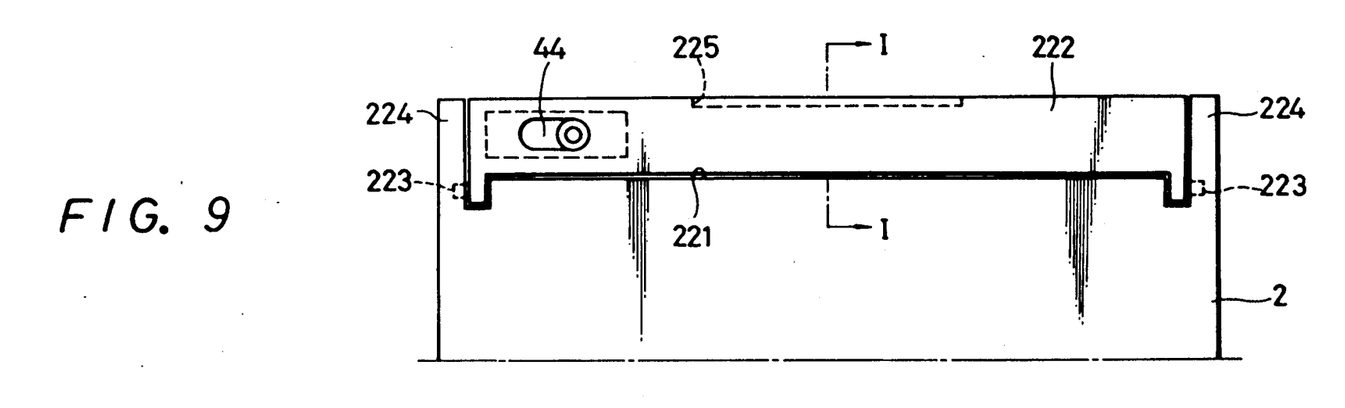
FIG. 9 is a plan view illustrating a main portion of another embodiment of the disk cartridge according to the present invention.
Figure 10A:
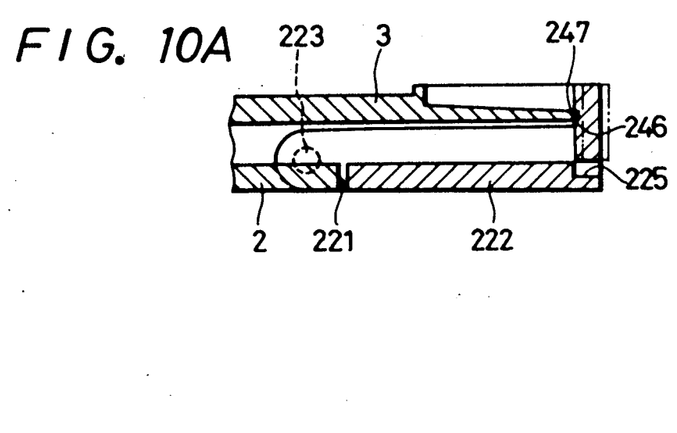
FIGS. 10A and 10B are cross-sectional views taken along the line I—I in FIG. 9, respectively.
Figure 10B:
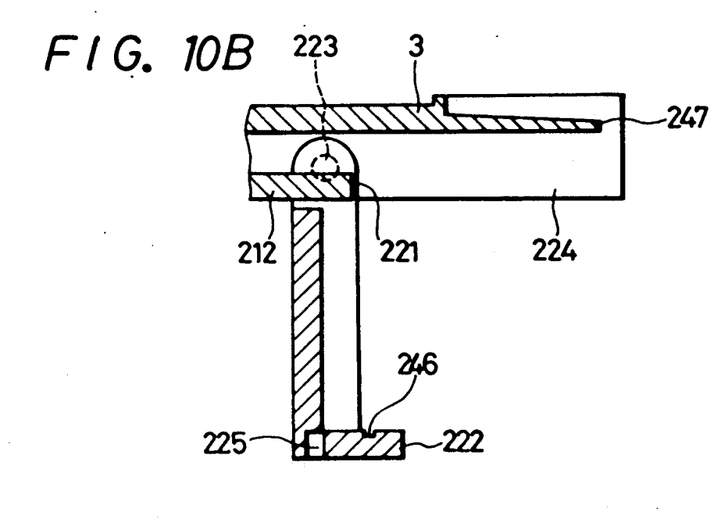

The second embodiment of the disk cartridge according to the present invention will hereinafter be described with reference to FIGS. 9 to 10. In FIGS. 9 and 10, like parts corresponding to those of the first embodiment are marked with the same references and therefore need not be described in detail. Let it be assumed that in the second embodiment other parts are formed in a similar manner to those of the first embodiment for simplicity.

As shown in FIG. 9 and FIGS. 10A and 10B, a cut-away portion 221 is formed through the upper cartridge half 2 of the disk cartridge-body 1 at its rear side. An openable and closable member, i.e., a lid 222 is rotatably attached to the cut-away portion 221. Referring to FIG. 9, the lid 222 is provided at its respective ends with pins 223. The pins 223 are rotatably supported at left and right side walls 224 of the upper cartridge half 2. A slit 225 is formed through the lower portion of the side wall of the lid 222, whereby the side wall of the lid 222 can be deformed. Thus, the lid 222 can be locked positively with ease.

Also, as shown in FIG. 9, similarly to the first embodiment, the over-write-preventing member 44 is provided on the side portion of the lid 222, and dependent on the position of the over-write-preventing member 44, the information signal recorded on the disk D is prevented from being mis-erased or the information signal is prevented from being recorded on the disk D after having been recorded.

The opening portion formed by the cut-away portion 221 provided on the rear lower portion of the disk cartridge-body 1 makes it possible to load and/or eject the disk D from the disk cartridge-body 1. When the lid 222 is opened as shown in FIG. 10B, the disk D can be ejected from the disk cartridge-body 1 via the above opening portion. The lid 222 to close the opening portion, is provided with the slit 225 extended in the lengthwise direction thereof as shown in FIG. 9, whereby the lid 222 is flexed at its top where a locked groove 246 is formed due to its flexible deformation. The flexing amount of the locked groove 246 and the locking force can be freely determined by adjusting the length of the slit 225. Thus, when the length of the slit 225 is adjusted in accordance with the thickness and the width of the locked groove 246 of the lid 222 to be engaged with a locking member 247 formed on the lower cartridge half 3 of the disk cartridge body-1, the optimum lock can be presented.

When the slit 225 used to adjust the flexed amount of the locking portion and the locking force is formed along the lid 222, if the former is formed on the side wall of the latter, the width of the slit 225 cannot be decreased considerably from a metal-mold standpoint so that dust and so on tend to enter the disk cartridge-body 1 through the slit 225. Therefore, in the disk cartridge of this embodiment, as shown in FIGS. 10A and 10B, the slit 225 is formed on the lid 222 at its front portion corresponding to the thick bottom wall portion, assuring a certain width of the metal mold. Since the slit 225 is formed on the lid 222 at its portion corresponding to the thick bottom wall portion as described above, the opening amount of the slit 225 can be substantially minimized, thus making it possible to substantially prevent the dust or the like from entering the disk cartridge-body 1.

While the present invention is described as above, the present invention is not limited to the above-mentioned embodiments but can take various modifications without departing from the gist of the invention. While the write-protecting mechanism, for example, is comprised of the over-write-preventing member and the position-restricting member, the write-protecting mechanism may be formed such that concave and convex portions are formed on the inner surface of the lid near the detecting aperture and that the over-write-preventing member is provided with a resilient arm as disclosed, for example, in official gazette of Japanese laid-open utility model application No. 60-183977. Further, the present invention can be applied to the disk cartridge, which is disclosed in U.S. Pat. No. 4,460,930, and to a disk cartridge which has no sliding shutter provided therein.

According to the disk cartridge of the present invention, since the write-protecting mechanism is provided on the openable and closable member which opens and closes the opening through which the disk is exchanged, the inner surface of one cartridge half of the pair of upper and lower cartridge halves forming the disk cartridge-body is made flat, thus protecting the signal-recorded-surface of the disk from being damaged when the disk is exchanged. Therefore, it is possible to prevent an error from occurring upon recording and/or reproduction.

Further, since the openable and closable member is provided with the write-protecting mechanism, the size of the opening portion through which the disk is exchanged can be increased. Thus, the position of the write-protecting mechanism is not restricted by the size and the position of the opening portion through which the disk is exchanged, thus making it possible to miniaturize the disk cartridge itself.

Furthermore, the slit is formed on one portion of the lid, the top portion of the lid at the side of the slit is arranged to be deformed with flexibility and the locked portion is provided at the top portion which can be deformed with flexibility, whereby the locked portion is engaged with the locking portion of the disk cartridge-body thereby to lock the lid in its closed state. Therefore, the flexed amount of the locked portion of the lid and the flexing force of the locked portion can be made optimum by the length of the slit, thus the reliability of the locking state being increased.

Further, regardless of the repetitive opening and closing operations of the lid, the locking force is made optimum so that the locking portions can be prevented from being worn thin, thus making it possible to stably keep the locked condition for a long period of time.

In addition, if the above-mentioned slit is formed on the corner portion of the two side walls perpendicular to each other at its portion corresponding to the first side wall and the second thick side wall, the effective opening amount of the slit can be substantially reduced considerably, thus preventing dust or the like from entering the disk cartridge-body.

The above description is presented by way of example on the preferred embodiments of the invention and it will be apparent that many modifications and variations thereof could be produced by one with ordinary skill in the art without departing from the spirit and scope of the novel concepts of the invention so that the scope of the invention should be determined only by the appended claims.

I claim as my invention:

1. A disk cartridge comprising:
 a) a disk cartridge-body for accommodating therein a freely rotatable disk-shaped record medium on which an information signal can be recorded;
 b) an openable and closable member for opening and closing an opening portion which is formed on the disk cartridge-body to exchange the disk-shaped record medium; and
 c) a write-protecting mechanism formed on the openable and closable member to determine whether or not the information signal can be recorded on the disk-shaped record medium and being arranged so as not to disengage from the openable and closable member.

2. A disk cartridge according to claim 1, in which the openable and closable member is formed so as to become detachable from and attachable to the disk cartridge-body.

3. A disk cartridge according to claim 1, in which the write-protecting mechanism is provided with disengage-preventing means by which the write-protecting mechanism can be prevented from being disengaged from the openable and closable member.

4. A disk cartridge according to claim 3, in which the write-protecting mechanism is provided with a detected element which can be slidably moved between first and second positions to determine whether or not the information signal can be recorded in the disk-shaped record medium, the first position indicating the fact that the information signal can be recorded in the disk-shaped record medium and the second position indicating the fact that the information signal is inhibited from being recorded in the disk-shaped record medium.

5. A disk cartridge according to claim 1, in which the openable and closable member is secured to the disk cartridge body by means of hinges so as to become freely openable and closable and the disk cartridge-body is provided with locking means for locking the openable and closable member at a position in which the opening portion is closed by the openable and closable member.

6. A disk cartridge according to claim 5, in which the disk cartridge-body is comprised of a pair of disk cartridge halves, one of the disk cartridge halves being provided with a lid as the openable and closable member and the other of the disk cartridge halves being provided with the locking means.

7. A disk cartridge according to claim 6, in which the lid has a lower portion formed with a slit therethrough and a locked portion is provided in the top portion of the lid which allows the lid to be deformed with flexibility by the slit.

8. A disk cartridge according to claim 7, in which the slit is formed on the lid at a lower portion corresponding to the juxtaposition of a first side wall and a thick portion of a second side wall in a corner portion formed perpendicularly by the first and second side walls.

9. A disk cartridge according to claim 1, in which the openable and closable member is provided with a rib which restricts the movement of the disk-shaped record medium within the disk cartridge-body.

10. A disk cartridge comprising:
 a) a disk cartridge-body for accommodating therein a disk-shaped record medium for recording an information signal, the record medium being freely rotatable within the cartridge-body which includes a pair of disk cartridge halves, one of the disk cartridge halves being provided with an engaging concave portion and the other one of the disk cartridge halves being provided with a locking portion;

b) an openable and closable member for opening and closing an opening portion which is formed on the disk cartridge-body to exchange the disk-shaped record medium;

c) an engaging member formed on the openable and closable member for engaging with the engaging concave portion of the one cartridge half;

d) a locked portion formed on the openable and closable member for engaging with the locking portion on the other disk cartridge half; and e) a write-protecting mechanism formed on the openable and closable member to determine whether or not the information signal can be recorded on the disk-shaped record medium.

* * * * *